March 26, 1968     C. W. MILES     3,374,866
MOUNTING MEANS FOR A SLIDING CALIPER DISK BRAKE
Filed Oct. 6, 1966     2 Sheets-Sheet 2
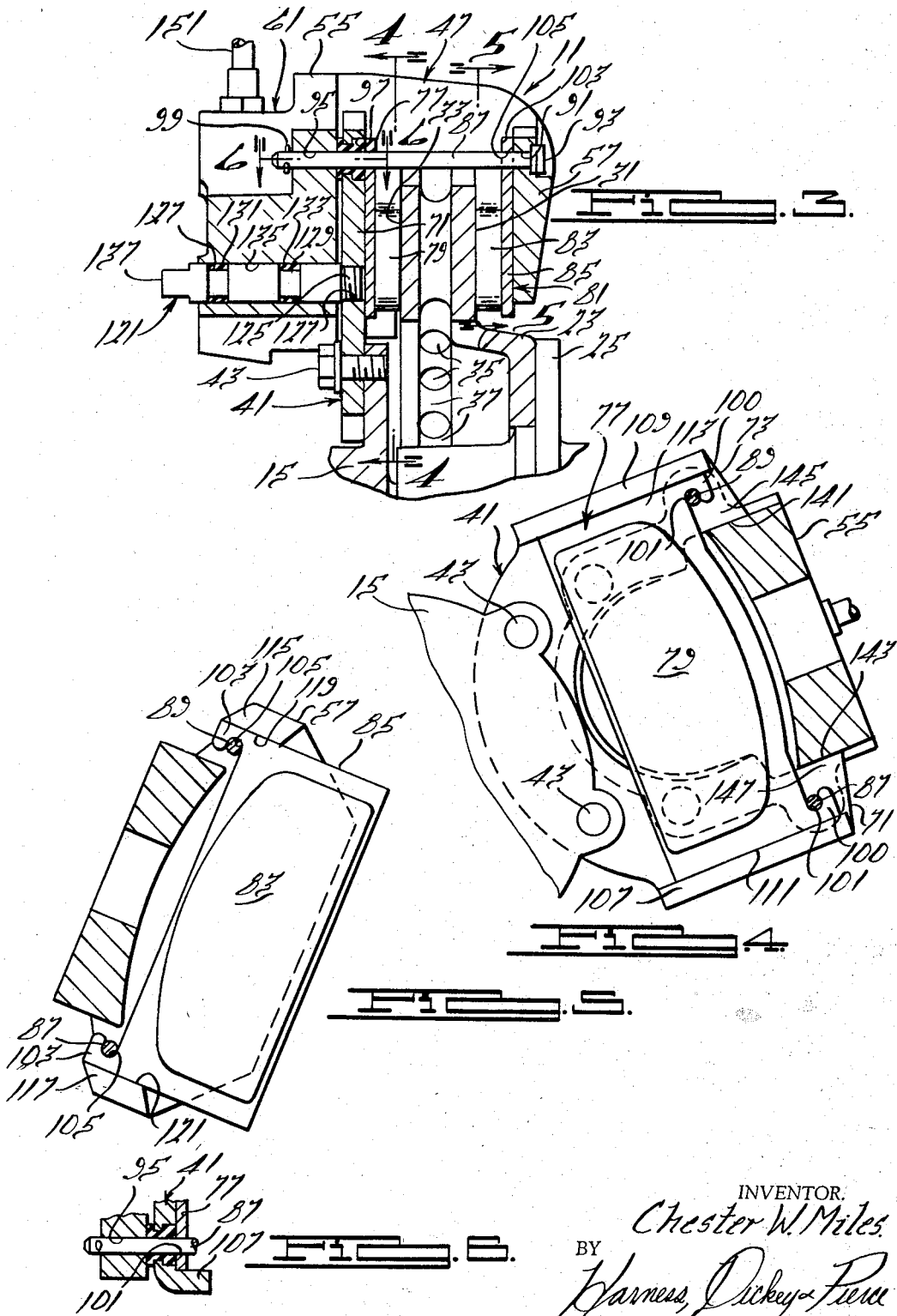
INVENTOR.
Chester W. Miles
BY Harness, Dickey & Pierce
ATTORNEYS.

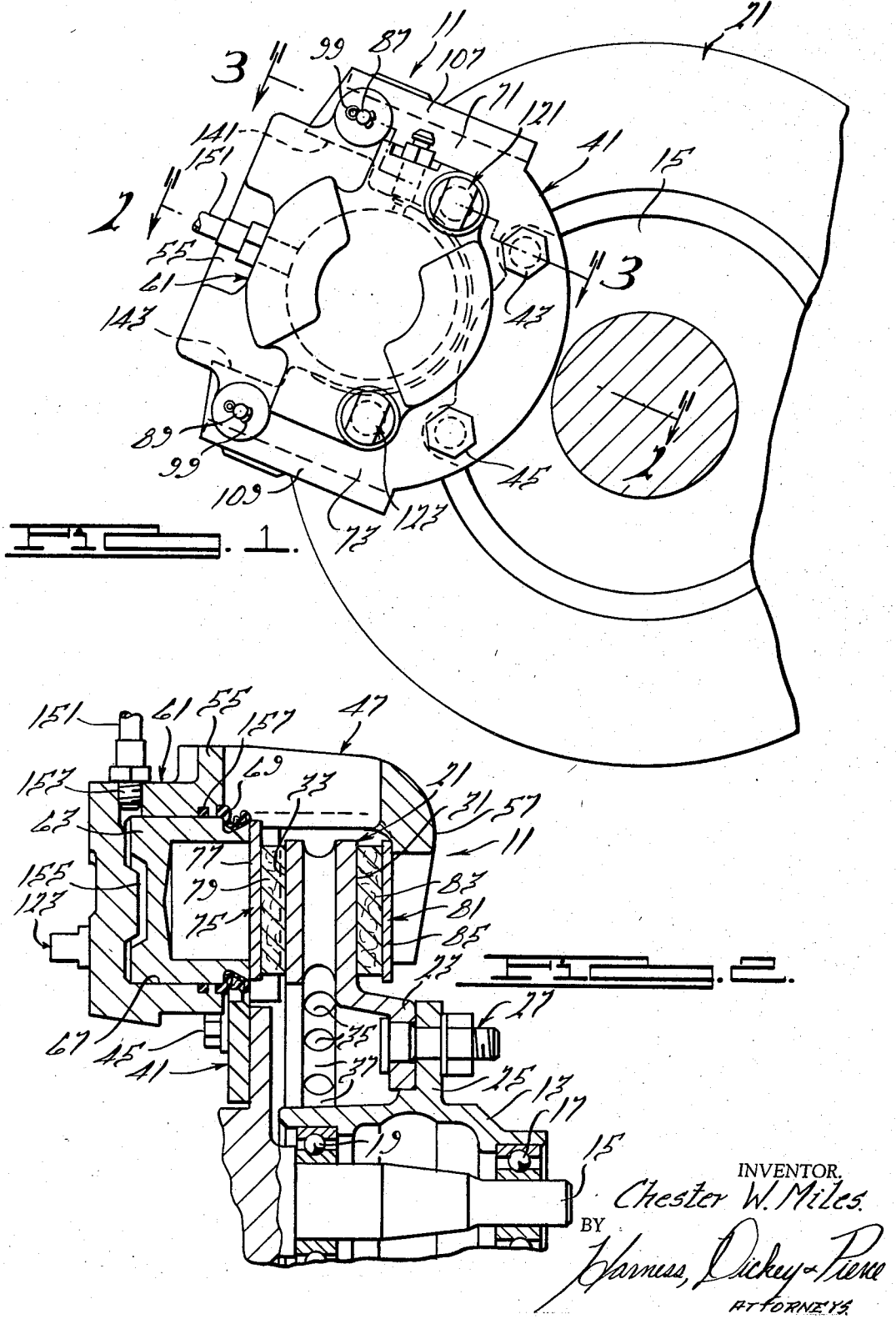

United States Patent Office 3,374,866
Patented Mar. 26, 1968

3,374,866
MOUNTING MEANS FOR A SLIDING
CALIPER DISK BRAKE
Chester W. Miles, Detroit, Mich., assignor to Kelsey-Hayes Company, Romulus, Mich., a corporation of Delaware
Filed Oct. 6, 1966, Ser. No. 584,803
4 Claims. (Cl. 188—73)

ABSTRACT OF THE DISCLOSURE

A sliding caliper type disk brake embodying a torque plate carrying a pair of outwardly extending pins that are perpendicular to the braking surface of the associated disk and which extend away from the disk. The caliper assembly of the brake has a pair of bores in one of its legs that slidably supports the caliper upon the pins. Resilient O-rings are interposed between the pins and caliper bores for exerting a restoring force upon the caliper when the brakes are released.

This invention relates to brakes for automotive vehicles, and more particularly to disk brakes in which an uncomplicated, compact and effective means is provided for permitting movement of a caliper and brake shoes relative to a disk to be braked in a direction to achieve proper braking action, while restraining other unwanted movement of the caliper and brake shoes relative to the disk.

In the invention, a stationary torque plate is disposed generally parallel to a rotary disk that may be attached to a wheel of an automotive vehicle. A caliper having a fluid motor portion positioned on one side of the disk and reaction portion on the other is held against rotation by the torque plate. A first brake shoe is disposed between the torque plate and the disk, and means are provided on the torque plate engageable with this brake shoe for the absorption of braking torque when the first brake shoe is motivated by the fluid motor portion of the caliper. A second brake shoe is disposed between the disk and the reaction portion of the caliper and is motivated by this reaction portion. The braking torque of the second brake shoe is absorbed by the caliper.

A pair of spaced pins is rigidly affixed to the torque plate and they slidably carry the caliper for movement generally perpendicular to the disk while restraining all other types of movement of the caliper with respect to this disk. The pins preferably extend in a direction away from the disk and are preferably slidably received in a pair of spaced bores in the fluid motor portion of the caliper. Moreover, each of these pins may have a threaded coupling engaging the torque plate at one end thereof and a portion thereof receiving a suitable tool at the other end thereof so that the pins may be suitably tightened down and adjusted by means of this tool. These pins and the bores in the fluid motor portion of the caliper may have O-rings positioned in cooperative engagement therewith for exerting a restoring force on the caliper subsequent to braking action.

The invention also provides a pair of spaced pins carried by the caliper and disposed generally perpendicularly to the plane of rotation of the disk with one or both of the brake shoes being supported on this pair of pins for movement toward and away from the disk.

The reaction portion of the caliper may have a pair of inwardly facing spaced shoulders disposed perpendicular to the disk with a brake shoe positioned between the inwardly spaced shoulders and having end portions engageable with the spaced shoulders so that the torque from the brake shoe is transferred to the caliper. Similarly, the stationary torque plate may have a pair of spaced shoulders disposed perpendicularly to the disk and the other brake shoe may have end portions engageable with these shoulders to provide the means for transferring the torque from this brake shoe to the stationary torque plate. In accordance with the preferred embodiment of the invention, this torque plate is disposed between the fluid motor portion of the caliper and this brake shoe.

The above-mentioned features of the invention provide an extremely uncomplicated, compact and efficient disk brake for an automotive vehicle wheel which will permit sliding movement of a caliper and brake shoes that are engageable with the rotary disk attached to the wheel of the automotive vehicle. Furthermore, the invention provides an uncomplicated and compact means for permitting movement of a caliper and brake shoes motivated by the caliper, in a direction generally perpendicular to the plane of rotation of the rotary disk to be braked. This means also effectively resists any other type of movement that might otherwise occur, such as, twisting of the caliper which would result in uneven wear of the edges of the brake linings.

An object of the present invention is the provision of an uncomplicated, compact and efficient disk brake that is especially suited for use in braking a wheel of an automotive vehicle.

Another object of the invention is the provision of an uncomplicated, compact and efficient disk brake in which an efficient and compact means is provided to permit the caliper of the disk brake to move in a direction generally perpendicular to the plane of rotation of the disk to be braked while simultaneously preventing other unwanted movement of the caliper with respect to the disk.

A further object of the invention is the provision of an uncomplicated, compact and efficient disk brake in which a caliper is supported on a fixed reaction member or torque plate by compact and efficient means which will permit the caliper to move in the proper direction to achieve proper braking action, but will prevent all other types of undesirable movement that may result in uneven wear of the brake shoes.

Other objects and advantages of the present invention may be more readily realized as the specification is considered in connection with the attached drawings, in which:

FIGURE 1 is an elevational view of a disk brake constructed in accordance with the invention and mounted on a stationary support member for a wheel of an automotive vehicle;

FIGURE 2 is a sectional view taken substantially along the lines 2—2 of FIGURE 1;

FIGURE 3 is a sectional view taken substantially along the lines 3—3 of FIGURE 1;

FIGURE 4 is a view taken along the lines 4—4 of FIGURE 3;

FIGURE 5 is a view taken along the lines 5—5 of FIGURE 3, and

FIGURE 6 is a sectional view taken along the lines 6—6 of FIGURE 3.

Referring now to the drawings in which like reference numerals designate like parts throughout the several views thereof, a disk brake of the present invention is illustrated generally at 11 in FIGURES 1 through 3 and is shown associated with a vehicle wheel assembly having a hub 13 rotatably supported on a stationary wheel spindle 15 by bearings 17 and 19. A brake disk or rotor 21 is provided with an attaching flange 23 secured to a flange 25 on the hub 13 by a suitable fastening means, for example, bolt and nut assemblies, one of which is shown at 27. The brake disk or rotor 21 has a pair of oppositely disposed brake shoe engaging faces 31 and 33 and also has a plurality of radially extending openings 35 that are spaced between webs 37 which serve to move cooling air outwardly through the openings 35 during turning movement of the rotor 21.

A torque plate or fixed reaction member 41 is secured to a support member formed integrally with the spindle 15 by suitable fastening means, for example, a pair of spaced bolts 43 and 45. The torque plate or fixed reaction member 41 extends in a plane generally parallel to the plane of rotation of the rotary disk 21 and generally parallel to each of the brake shoe engaging faces 31 and 33.

A generally C-shaped housing or caliper 47 is provided with generally opposed legs 55 and 57 disposed on opposite sides of the rotor 21, with the leg 57 disposed in spaced confronting relationship to the rotor face 31 and with the leg 55 disposed in spaced confronting relationship to the rotor face 33. A fluid motor 61 is carried by the caliper leg 55, which forms a fluid motor portion of the caliper, and it includes a piston 63 slidably disposed in a cylinder bore 67 formed in the leg 55. A flexible boot 69 is fixed at its ends to the caliper leg 55 and to the piston 63 to prevent contamination of the sliding piston and cylinder bore surfaces. The piston 63 extends between two radially extending legs 71 and 73 of the torque plate or fixed reaction member 41. The outer end of the piston 63 is positioned to engage a brake shoe 75 that includes a backing plate 77 and a brake lining 79 that may be suitably secured thereto, for example, by bonding. Another brake shoe 81 comprised of a brake lining 83 and a backing plate 85 suitably bonded to the brake lining 83 is positioned so that the brake lining 83 is in opposed relationship to the radial face 31 of the rotor 21.

The brake shoes 75 and 81 are slidably supported by the caliper 47 for movement in a direction generally perpendicular to the plane of rotation of the disk 21 and to the rotor faces 31 and 33 through the medium of a pair of pins 87 and 89. Each pin is carried by the caliper 47 and as shown in FIGURE 3 the leg 57 which forms the reaction portion of the caliper 47 has a bore 91 receiving the head end 93 of pin 87 and the leg 55 has a bore 95 receiving the other end of the pin 87. As illustrated in FIGURE 3, the pin 87 also passes through and is held by a resilient grommet or bushing 97 positioned in leg 71 of the torque plate or reaction member 41. A suitable fastening means, for example, a cotter key 99 secures the pin 87 in the caliper 47. It should be understood, of course, that the pin 89 is similarly positioned and supported by the caliper 47.

As can best be seen by reference to FIGURE 4, the backing plate 77 has an extension 100 with a slot 101 at each end thereof for the reception of pins 87 and 89, respectively. Similarly, the backing plate 85 has a pair of extensions 103, having a slot 105 positioned at each end thereof for the reception of pins 87 and 89, respectively. It can be seen therefore that the pins 87 and 89 slidably support the brake shoes 75 and 81 for movement in a direction generally perpendicular to the plane of rotation of the disk 21 and to the planes defined by the brake shoe engaging faces 31 and 33 of the rotor 21.

The troque plate or stationary reaction member 41 has a pair of inwardly facing flanges or shoulders 107 and 109 positioned at the outer edges of the legs 71 and 73, respectively, which extend generally perpendicularly to the plane of rotation of the disk 21 and to the plane of the backing plate 77 to which the brake lining 79 is attached. Complementary shoulders 111 and 113 on the backing plate 77 engage the shoulders 107 and 109, respectively, on the legs 71 and 73 of the torque plate or stationary reaction member 41 so that the braking torque absorbed by the brake shoe 79 during braking operations is transferred to the torque plate or stationary reaction member 41.

In a like manner, the leg 57 of the caliper 47 has a pair of inwardly extending spaced shoulders 115 and 117, as can best be seen by reference to FIGURE 5. The backing plate 85 carrying brake lining 83 has complementary edges or shoulders 119 and 121 that engage the shoulders 115 and 117, respectively, on the leg 57 of the caliper 47. Upon braking operations, therefore, the braking torque absorbed by the brake shoe 83 is transferred to the leg 57 of the caliper 47 through the backing plate 85 and the shoulders described above formed on the backing plate and the leg 57 of the caliper 47.

The caliper or housing 47 is supported on the torque plate or stationary reaction member 41 for movement generally perpendicular to the plane of rotation of the rotary disk 21 and the faces 31 and 33 thereof by means of a pair of spaced pins 121 and 123. One of the pins 121 is shown more specifically and in cross section in FIGURE 3. It should be understood, however, that the other pin 123 is identical to the pin 121. The pin 121 has a reduced threaded section 125 that is threaded into a complementary threaded bore 127 in the leg 71 of the reaction member or torque plate 41. The pin 121 also has a pair of circumferential grooves 127 and 129 positioned in the periphery thereof for the reception of O-rings 131 and 133.

Each of the pins 121 and 123 is received in a sliding fit relationship in a complementary bore formed in the leg 55 of the caliper 47. Each of the bores has an axis extending in a direction perpendicular to the plane of the torque plate 41, the plane of rotation of the rotary disk 21 and the planes defined by the brake shoe engaging faces 31 and 33 formed on the rotor 21.

Referring now to FIGURE 3, the bore for receiving the pin 121 is designated by the numeral 135 and it receives the pin in a sliding fit relationship. The O-rings 131 and 133 engage the wall of the bore 135 and, as will be described subsequently, they exert a restoring force on the caliper 47 when braking operations have been completed. The pin 121 has a means for receiving a tool positioned at the end 137 thereof opposite the threaded end 125, so that in the assembly of the disk brake the torque plate 41 may be inserted in position and the pin 121 positioned through the bore 135 and then turned down tightly to rigidly affix it to the torque plate 41. It should be understood that pin 123 is identically formed so that it too may be inserted through its complementary bore in the caliper leg 55 and then subsequently be turned down tightly to rigidly affix it to the torque plate 41.

Referring now to FIGURE 4, it can be seen that the caliper 47 is further secured against rotation with respect to the torque plate 41 by means of outwardly extending shoulders 141 and 143 positioned on the leg 55 of the caliper which engage spaced inwardly extending shoulders 145 and 147 positioned on the legs 73 and 71, respectively, of the torque plate 41. These shoulders extend in spaced parallel planes that are generally perpendicular to the plane of rotation of the rotor 21 and planes defined by the brake shoe engaging faces 31 and 33 positioned thereon.

Referring now to FIGURES 1 and 2, it can be seen that the fluid motor 61 may be actuated by a fluid under pressure that is supplied through a line 151 and a fitting 153 to a chamber 155 positioned behind the piston 63. An O-ring seal 157 provides a fluid seal between the piston 63 and the cylinder 67 in which it operates. This O-ring seal is preferably rectangular in cross section and as a result it will twist when the fluid motor 61 is energized and will exert a restoring force on the piston 63 when braking operations have been completed.

During braking operations, fluid under pressure generated by a brake pedal operated piston or other device is supplied through the line 151 and fitting 153 to the chamber 155. This action moves the piston 63 of the fluid motor 61 to the right, as viewed in FIGURE 2, thereby causing the brake lining 79 of the brake shoe to be engaged with a braking force on the braking face 33 of the rotor 21. Simultaneously, the caliper 47 is moved to the left, as viewed in FIGURES 2 and 3, thereby bringing the brake lining 83 of brake shoe 81 into engagement with the braking face 31 of the rotor 21 with sufficient force to provide a braking action.

The movement of the caliper 47 to the left with respect to the stationary torque plate 41 is confined to a direction substantially perpendicular to the plane of rotation of the disk 21 and to the planes defined by the braking faces 31 and 33 positioned thereon. This is accomplished by means of the pins 121 and 123 which are slidably received in the bores 135 of the leg 55 of the caliper 47. At this time the O-rings 131 and 133 are stressed slightly so that they exert a restoring force for returning the caliper 47 to the right, as viewed in FIGURES 2 and 3, when the braking operation has been completed.

The leg 57 of the caliper 47 absorbs the braking torque transmitted to the brake lining 83 by the face 31 of the rotary disk 21 by means of the edges or shoulders 119 and 121 formed on the edges of the backing plate 85 and the complementary shoulders 115 and 117 formed on the leg 57 of the caliper 47. Similarly, as previously pointed out, the braking torque transmitted from the face 33 of the rotary disk 21 to the brake lining 79 is absorbed by the complementary shoulders 111 and 113 formed on the backing plate 77 and the shoulders 107 and 109 formed on the torque plate or stationary reaction member 41.

It can be appreciated that this transmission of the braking torque to the leg 57 of the caliper 55 and to the torque plate 41 creates a twisting couple tending to twist the caliper 47 about the torque plate or stationary reaction member 41 in a plane substantially perpendicular to the plane of rotation of the rotary disk 21 and to the planes defined by the brake shoe engaging faces 31 and 33 of the rotor 21. Any such twisting of the caliper would cause uneven wear of the edges of the brake linings 79 and 83 and in addition may cause undesirably large sulf-energization or servo action of the brake. This twisting torque due to this couple is resisted, however, and prevented by the pins 121 and 123. Thus, the pins successfully resist and prevent any undesired movement of the caliper 47 and permit such movement only in a direction substantially perpendicular to the plane of rotation of the rotor 21 and to the planes defined by the braking surfaces 31 and 33 positioned thereon thereby preventing any uneven wear of the brake linings and a minimum of undesirable servo action.

The grommets, or bushings, 97, frictionally engage the two pins 87 and 89 and hence may exert some restoring force on the caliper 47 when braking action has been completed. This may supplement the restoring force applied by the O-rings 131 and 133 carried by the pins 121 and 123. Additionally, these grommets or bushings 97 serve as vibration dampeners, and also, as shown more specifically in FIGURES 3 and 6, serve as a stop means for movement of the caliper to the right, as well as providing a proper spacing between the torque plate 41 and the leg 55 of the caliper 47.

It can also be appreciated that the disk brake of the present invention is easy to assemble in that the torque plate may be properly inserted in its position with respect to the caliper. Thereafter, the pins 123 and 121 may be inserted in the bores 135 positioned in the fluid motor portion 55 of the caliper 47 and threaded into the torque plate 41. Subsequently, the pins 87 and 89 may be properly inserted and fastened in place.

The present invention thus provides an extremely uncomplicated, compact and efficient disk brake in which all undesired movement of the caliper of the brake as well as the brake shoes is successfully resisted and substantially prevented, while simultaneously permitting the desired movement of the caliper in a direction substantially perpendicular to the plane of rotation of the disk to be braked.

It is to be understood, of course, that although a preferred embodiment of the invention has been shown and described, that various modifications, substitutions and additions may be made thereto without departing from the spirit of the invention as encompassed in the attached claims.

What is claimed is:

1. A disk brake for braking a rotating disk having oppositely facing braking surfaces comprising a torque plate affixed against rotation relative to the brake disk and juxtaposed to one of the braking surfaces of the brake disk, a caliper having a pair of spaced legs, a first of said caliper legs being juxtaposed to said torque plate on the side of said torque plate opposite to the brake disk, the other of said caliper legs being juxtaposed to the other braking surface of the brake disk, a first brake pad associated with said one caliper leg and having a frictional surface adapted to engage the one braking surface of the disk, a second brake pad associated with said other caliper leg and having a frictional lining surface adapted to engage the other braking surface of the disk, actuating means carried by said first caliper leg for actuating said first friction pad to bring its lining into engagement with the one braking surface of the brake disk and for effecting a reactive movement of said caliper for bringing the frictional lining of said second brake pad into engagement with the other braking surface of the disk, a pair of spaced pins fixed to said torque plate and extending substantially perpendicularly to the braking surfaces of the brake disk and away from the brake disk, said first caliper leg having a pair of spaced bores slidably receiving said pins for supporting said caliper for sliding movement relative to said torque plate in a substantially perpendicular direction relative to the braking surfaces of the disk upon operation of said actuating means, and resilient O-rings interposed between each of said pins and the respective of said bores for deflection upon sliding movement of said caliper and for exerting a restoring force upon said caliper upon the cessation of operation of said actuating means.

2. The combination of claim 1 including a second pair of spaced pins, carried by said caliper and disposed generally perpendicular to said disk, said first brake pad being supported on said second pair of pins for movement toward and away from the disk.

3. The combination of claim 1 in which said other leg of said caliper has a pair of inwardly facing spaced shoulders disposed perpendicular to the disk and said second brake pad is positioned between said inwardly spaced shoulders and has end portions engageable therewith.

4. The combination of claim 3 in which said stationary torque plate comprises a pair of spaced shoulders disposed perpendicular to the disk and said first brake pad has end portions engageable with said shoulders.

References Cited

UNITED STATES PATENTS

| 3,199,635 | 8/1965 | Bessler et al. | 188—73 |
| 3,213,969 | 10/1965 | Rosanowski et al. | 188—73 |
| 3,243,016 | 3/1966 | Swift | 188—73 |

FOREIGN PATENTS

| 1,353,793 | 1/1964 | France. |
| 728,376 | 4/1955 | Great Britain. |
| 321,634 | 6/1957 | Switzerland. |

FERGUS S. MIDDLETON, *Primary Examiner.*

G. E. HALVOSA, *Assistant Examiner.*